US012002154B1

(12) United States Patent
Good et al.

(10) Patent No.: US 12,002,154 B1
(45) Date of Patent: Jun. 4, 2024

(54) SYSTEMS AND METHODS FOR AUTOMATIC AND DYNAMIC GENERATION OF SHAPE-CONFORMING AND COMPUTATIONALLY EFFICIENT COLLIDERS FOR POINT CLOUDS

(71) Applicant: Illuscio, Inc., Culver City, CA (US)

(72) Inventors: Max Good, Los Angeles, CA (US); Dwayne Elahie, Montreal (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/419,088

(22) Filed: Jan. 22, 2024

(51) Int. Cl.
*G06T 17/00* (2006.01)
*G06T 3/4023* (2024.01)

(52) U.S. Cl.
CPC ............ *G06T 17/00* (2013.01); *G06T 3/4023* (2013.01); *G06T 2210/21* (2013.01)

(58) Field of Classification Search
CPC .... G06T 17/00; G06T 3/4023; G06T 2210/21
See application file for complete search history.

(56) References Cited

U.S. PATENT DOCUMENTS

| | | | |
|---|---|---|---|
| 2018/0004290 | A1 | 1/2018 | Shtraym |
| 2018/0161671 | A1 | 6/2018 | Heubel |
| 2021/0117002 | A1 | 4/2021 | Eagleman et al. |
| 2021/0217248 | A1* | 7/2021 | Shimizu ................ G06T 19/006 |
| 2021/0383613 | A1 | 12/2021 | Bullock |
| 2022/0326760 | A1 | 10/2022 | Karafin et al. |
| 2023/0418288 | A1* | 12/2023 | Greiner ................ G05D 1/0214 |

* cited by examiner

*Primary Examiner* — Jeffery A Brier
(74) *Attorney, Agent, or Firm* — Ansari Katiraei LLP; Arman Katiraei; Sadiq Ansari

(57) ABSTRACT

A three-dimensional (3D) interactivity system automatically and dynamically generates shape-conforming and computationally efficient colliders for detecting collisions with automatically differentiated features represented by different sets of points in a point cloud. The system selects a set of points that represent a particular feature of a 3D object, decimates the set of points to a subset of points that represent an approximate shape of the particular feature with fewer points than the set of points, and generates a collider with the approximate shape represented by the subset of points. The system may then use the collider in determining whether a collision element collides with the particular feature.

20 Claims, 10 Drawing Sheets

SYSTEMS AND METHODS FOR AUTOMATIC AND DYNAMIC GENERATION OF SHAPE-CONFORMING AND COMPUTATIONALLY EFFICIENT COLLIDERS FOR POINT CLOUDS

BACKGROUND

A three-dimensional (3D) object may be defined with points of a point cloud, polygons of a mesh model, or other primitives that collectively form the 3D shape and visual characteristics of that 3D object. However, the points, polygons, or other primitives do not define the interactivity or reactivity of the 3D object and are not used for collision detection (e.g., determining if another object or input makes contact with the 3D object).

Colliders are separately defined data structures that are associated with the 3D object to specify the interactivity or reactivity for different parts of the 3D object and/or are used to detect when contact or impact is made with the 3D object. Colliders are defined separate from the points, polygons, or other primitives of the 3D object for computational efficiency. For instance, it is computationally much more efficient to compare the position of an input with a surface of a simple sphere that represents a 3D object rather than the position of each and every point, polygon, or other primitive of the 3D object. However, the use of simple shapes, such as spheres, cubes, cylinders, etc., as colliders comes at the cost of inaccurate collision detection. Specifically, the simple shapes may differ significantly from the contours or outlines of various complex shapes formed by the points, polygons, or other primitives of the 3D object.

Moreover, graphics artists are typically tasked with creating and associating the colliders to the 3D objects. The manual generation and association of colliders further reduces the accuracy of collision detection while also increasing time and effort to add interactivity to 3D objects.

DETAILED DESCRIPTION OF PREFERRED EMBODIMENTS

Figure 1:
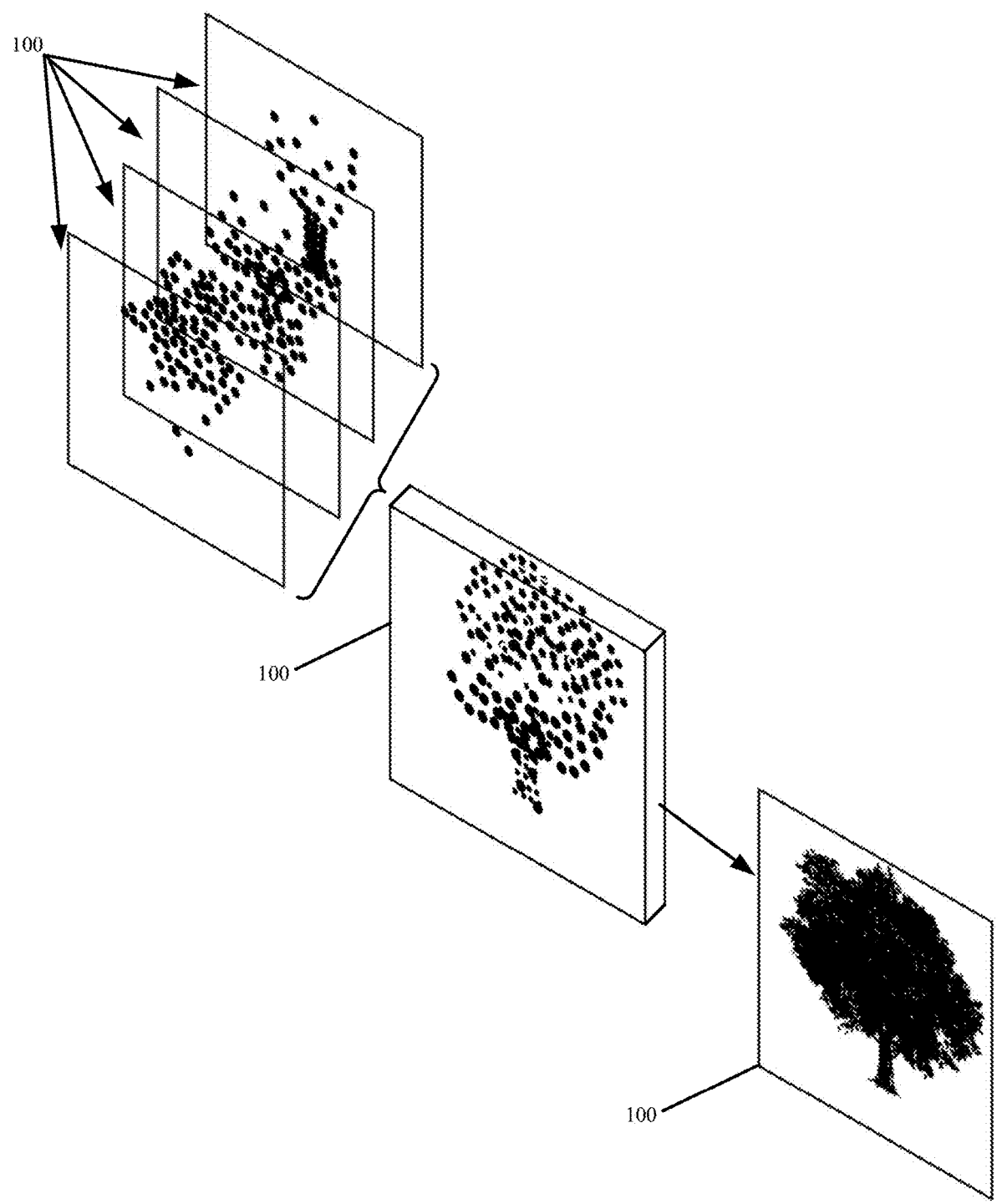
FIG. 1 illustrates an example point cloud in accordance with some embodiments presented herein.

The following detailed description refers to the accompanying drawings. The same reference numbers in different drawings may identify the same or similar elements.

Provided are systems and associated methods for automatically and dynamically generating shape-conforming and computationally efficient colliders for point clouds. The automatic and dynamic collider generation includes performing an automated analysis of the points of a point cloud to differentiate different set of points that form different features of a three-dimensional (3D) object represented by that point cloud, and dynamically defining and associating the shape-conforming colliders for each differentiated feature using a decimated subset of the different set of points forming each feature.

A 3D interactivity system may use attributes of the point cloud points to automatically differentiate the sets of points for different features of the represented 3D object. For instance, the 3D interactivity system may differentiate a set of points forming a particular feature based on material property, color, surface normal, and/or other commonality in the attributes of the set of points.

In some embodiments, the 3D interactivity system uses artificial intelligence and/or machine learning (AI/ML) techniques for the feature differentiation and/or collider definition. For instance, the 3D interactivity system may render the points of the point cloud, and may use various object and/or pattern recognition techniques to differentiate features of a 3D object from the rendered visualization of that 3D object, and may determine the sets of points forming each of the differentiated or recognized features.

The 3D interactivity system may dynamically define a collider by selecting a decimated subset of points from the set of points forming a differentiated feature, and by generating a surface, plane, volume, or other shape that spans or connects the decimated subset of points as the collider. For instance, the 3D interactivity system may define a function that creates a shape that conforms or closely approximates the shape of the decimated subset of points and/or the simplified form of the differentiated feature represented by the decimated subset of points, may anchor, attach, or otherwise associate the created shape to one or more of the subset of points at the corners or edges of the differentiated feature, and may use the associated shape to efficiently detect collisions with the set of points of the differentiated feature. In some embodiments, the 3D interactivity system may define the collider directly from the decimated subset of points, and may check for collisions with the differentiated feature based on collisions that occur with the decimated subset of points. In some such embodiments, the decimated subset of points include points that form the outer or exterior surface(s) of the differentiated feature and exclude points that form the interior of the differentiated feature.

The 3D interactivity system may dynamically define the colliders with different shape-conforming granularity or specificity to further improve the computational efficiency of using the generated colliders to detect collisions with different features of different 3D objects in a 3D scene or environment. For instance, depending on the distance between an interactive feature and user input or another impacting object, the 3D interactivity system may define the collider based on a greater or lesser decimation of the points representing the interactive feature, and may adjust the number of functions, shapes, and/or colliders used to represent the interactive feature. If the interactive feature is in the background or far from the user input, the 3D interactivity system may define a simple sphere or cube as the collider for the interactive feature. As the interactive feature moves into the foreground or closer to the user input, the 3D interactivity system may define multiple shapes or complex shapes for a more-detailed and accurate collider.

In some embodiments, the 3D interactivity system factors in the compute power of the device used to render and/or present the point cloud when dynamically defining the colliders for the point cloud features. The 3D interactivity system defines the colliders with simpler shapes and based on a greater decimation of points when the compute power is below a threshold, and with more complex shapes and based on a lesser decimation of points when the compute power is greater than the threshold. In this manner, the 3D interactivity system may dynamically generate the colliders to retain a common level of performance across different devices with different compute resources, and thereby provide an equivalent quality of experience for interacting with the 3D objects without causing the under-powered devices to lag or slow down because of resource-intensive collision detection calculations.

FIG. 1 illustrates an example point cloud 100 in accordance with some embodiments presented herein. Point cloud 100 may represent a 3D object or a 3D scene with points that are distributed in a 3D space to collectively generate the shape and visual characteristics of the 3D object or scene. Other 3D models or formats may use meshes or polygons as the primitives to generate the shape and visual characteristics of the 3D object or scene.

The points of point cloud 100 differ from pixels of a 2D image because certain regions of point cloud 100 may have no points, lower densities of points, and/or higher densities of points based on varying amounts of visual information that is defined, detected, or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D environment in the 3D space.

The positional elements may also include a surface normal. The surface normal defines the angle, direction, or orientation that the surface, feature, or article of the 3D object or the 3D environment represented by the point cloud point faces or is exposed to. More specifically, the surface normal for a particular point is a line, ray, or vector that is perpendicular to the surface, feature, or article represented by that particular point.

The non-positional elements may include information about the detected characteristics of the surface, feature, or article imaged at a corresponding position in the 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Each point cloud point may include an array of elements. The array of elements may provide the positioning of the point in the 3D space as well as one or more characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual points of point cloud 100 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100.

The points of a point cloud exist or are defined independent of one another. In other words, there is no encoded differentiation for the different sets of points that form different parts or features of the 3D object or 3D scene. Therefore, in order to define shape-conforming colliders for a point cloud and/or for the interactive features of the 3D object or 3D scene represented by the point cloud, the 3D interactivity system performs feature differentiation.

The 3D interactivity system performs the feature differentiation to detect the different sets of points within the point cloud that form different features of the 3D object that may be collided with or otherwise interacted with. In other words, the 3D interactivity system does not define a single monolithic collider for a point cloud that has various extensions, protrusions, indentations, bends, curves, spikes, and/or other shapes corresponding to the different features of the represented 3D object. Rather, the 3D interactivity system identifies the sets of points that form the different features, and generates a collider for each differentiated feature with a shape that conforms to the shape of that differentiated feature.

Figure 2:
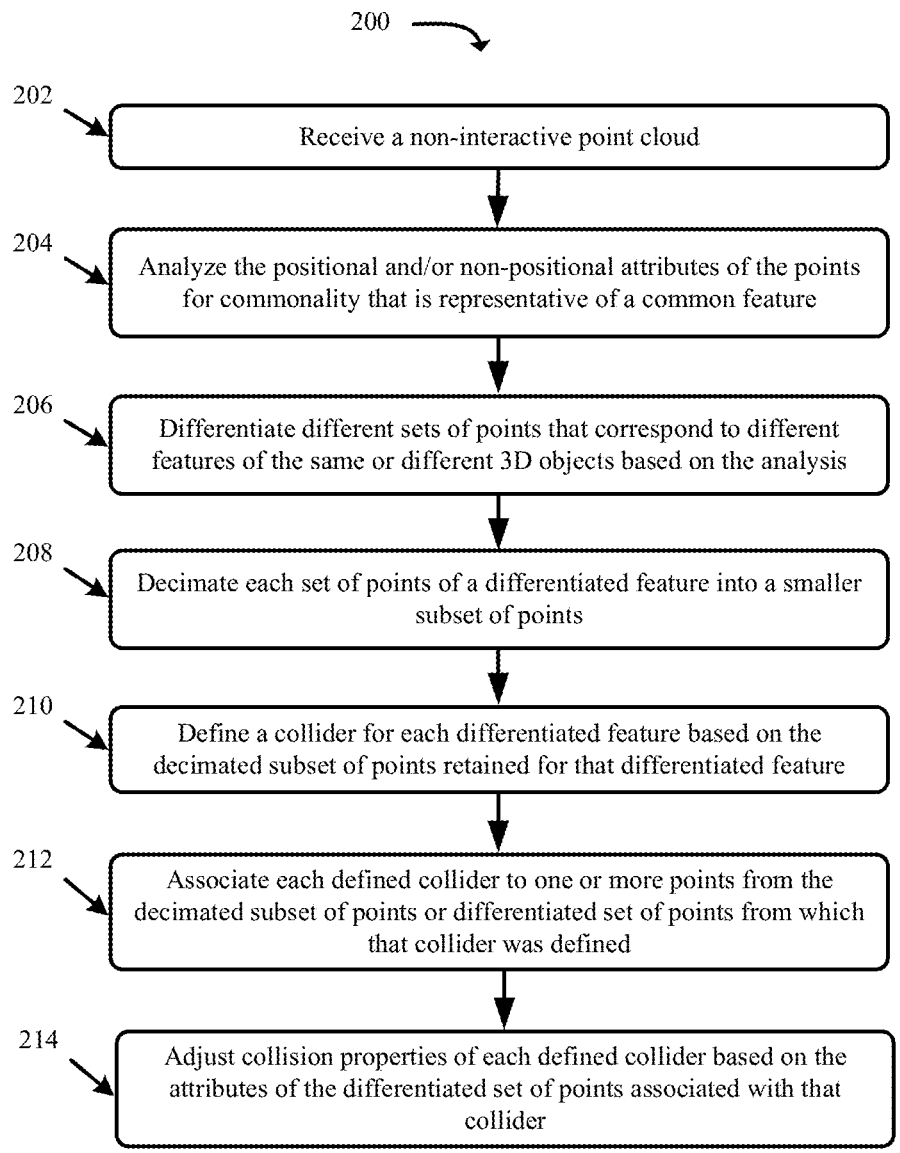
FIG. 2 presents a process for dynamically generating colliders from differentiated features of a point cloud in accordance with some embodiments presented herein.

FIG. 2 presents a process 200 for dynamically generating colliders from differentiated features of a point cloud in accordance with some embodiments presented herein. Process 200 is implemented by the 3D interactivity system. Specifically, process 200 is implemented using processor, memory, storage, network, and/or other hardware resources of the one or more machines and/or devices of the 3D interactivity system that automatically add interactivity to a point cloud by dynamically generating the shape-conforming colliders for the features differentiated from the point cloud points.

Process 200 includes receiving (at 202) a non-interactive point cloud. The non-interactive point cloud includes a multitude of distributed points that collectively represent one or more 3D objects in a 3D space. However, the points exist or are defined independent of one another as in a standard point cloud. In other words, the point cloud definition and/or encoding does not specify which points are connected or are used to form solid, impenetrable, elastic, reactive, moveable, or other interactive surfaces or features. The point cloud definition and/or encoding also does not specify which points form a common feature or object. As such, the non-interactive point cloud is defined or encoded without any colliders.

Process 200 includes analyzing (at 204) the positional and/or non-positional attributes of the points for commonality that is representative of a common feature. For instance, points that form the same feature in the point cloud will be positioned adjacent to one another or about some continuous segment. Additionally, the points that form the same feature may have or share other commonality including having related colors or colors that gradually change from one another, having surface normals that are directed in the same direction or that gradually change for a curved surface, having non-positional elements defined with the same material property (e.g., plastic, metal, rubber, ceramic, rigid, soft, transparent, reflective, etc.), and/or forming a repeating structural or visual pattern. For instance, points forming a particular feature may be arranged or positioned in a specific pattern or may have a specific color pattern that repeats or has a predicable variation or deviation. Conversely, points forming different features may be positioned next to one another but are likely to be arranged according to different patterns or structures, have varying or conflicting surface normals, different coloring, different material properties, and/or other differences in their respective positional and non-positional elements.

Process 200 includes differentiating (at 206) different sets of points that correspond to different features of the same or different 3D objects based on the analysis. Differentiating (at 206) the different sets of points may include selecting the set of points that share the same commonality and are associated with a common feature based on the shared commonality. Differentiating (at 206) the different sets of points may include grouping or tagging the set of points that are identified as belonging or forming the same feature.

In some embodiments, the 3D interactivity system limits the feature differentiation so that each set of differentiated points is of a minimal size or occupies a minimal region of space in the point cloud. For instance, the 3D interactivity system may differentiate each finger of a 3D character hand, but that level of differentiation may be too specific or too small for the desired interactivity (e.g., result in too many colliders or result in colliders that are too small). Accordingly, the 3D interactivity system may expand the feature differentiation so that all the fingers and the hand of the 3D character are differentiated as one feature. As another example, the hairs on the head of a 3D character may be differentiated from the eyes, mouth, and head. However, the differentiation results in features that are too small or too detailed. Accordingly, the 3D interactivity system may combine the sets of points detected for the hairs, eyes, mouth, and head as one differentiated feature. In other words, the 3D interactivity system may group or combine different sets of points with different commonality as a single differentiated feature and for which a single collider will be defined to reduce the computational overhead for collision detection and prevent the generation of too many colliders.

In some embodiments, the limiting of the feature differentiation may be based on available compute resources. A greater amount of available compute resources may allow for more granular or smaller feature differentiation, whereas a lesser amount of available compute resources may require less granular or larger feature differentiation.

In some embodiments, the 3D interactivity system may use AI/ML techniques to perform the analysis (at 204) and feature differentiation (at 206). For instance, the 3D interactivity system may render the points of the point cloud to generate visualizations of the 3D objects, and may input the visualizations into an image or object recognition system or classifier. The image or object recognition system or classifier may identify and provide identifying labels to features of the 3D objects that are detected from the rendered visualizations, and the 3D interactivity system may link the identifying labels back to the sets of points from which those detected features are rendered.

In some other embodiments, the 3D interactivity system may use the AI/ML techniques to perform the analysis (at 204) and feature differentiation (at 206) based on the detection of simple shapes in the point cloud regardless of point attribute commonality. For instance, the AI/ML techniques may render the point cloud or may analyze the positioning of the point cloud points, and may determine a partitioning that groups the most points within simple collider shapes (e.g., cube, sphere, cone, truncated cone, cylinder, torus, pyramid, cuboid, etc.). The partitioning includes differentiating features by selecting the different sets of points that are represented by one of the simple collider shapes.

Process 200 includes decimating (at 208) each set of points of a differentiated feature into a smaller subset of points. As described below, a collider is generated for the differentiated feature based on the decimated subset of points. The 3D interactivity system may perform different decimations depending on how the colliders are generated, an acceptable amount of deviation between the collider shape and the shape of the differentiated feature, available resources for collision detection, and/or other factors.

In some embodiments, the decimated subset of points may include some or all of the points forming the exterior or outer surface(s) of a volumetric feature. In some such embodiments, the decimated subset of points excludes the points from the set of points that form the inside or inner surfaces of that volumetric feature.

In some embodiments, the decimated subset of points may include some or all of the points forming the edges or corners of the differentiated feature. In some such embodiments, the decimated subset of points may include a sampling of points that outline the shape of the differentiated feature.

In some embodiments, the decimated subset of points may include a sampling of the set of points. For instance, the decimated subset of points may include every fifth point from the set of points.

In any case, decimating (at 208) the differentiated set of points for each detected feature in the point cloud includes reducing the number of points that will be used for generating the collider for that feature. The decimated subset of points provide points-of-reference for a simplified representation of the differentiated feature shape with the amount of decimation controlling how much of the differentiated feature shape is preserved, retained, or represented by the decimated subset of points.

Process 200 includes defining (at 210) a collider for each differentiated feature based on the decimated (at 208) subset of points retained for that differentiated feature. Specifically, the 3D interactivity system defines (at 210) a collider that has the simplified shape formed by the decimated (at 208) subset of points or that approximates the simplified shape by deviating from the simplified shape by less than a threshold amount. For instance, the collider may be defined as a cylinder that intersects one or more of the decimated (at 208) subset of points and is within the threshold distance (e.g., +/−5 units in the x, y, and/or z coordinates) of the other points from the decimated (at 208) subset of points.

Defining (at 210) the collider may include determining a function that generates a shape to span the volume, plane, area, or region between the decimated subset of points or that is spanned by the decimated subset of points. For instance, the 3D interactivity system may define (at 210) a first function for generating a sphere of a specific size or volume to serve as the collider for a first decimated subset of points that are distributed in a spherical pattern and that represent the points about an outer surface of a first differentiated feature, and may define (at 210) a second function for generating a curved plane that spans the area between a second decimated subset of points that represent the corners or edges of a second differentiated feature. In some embodiments, the 3D interactivity system may set the decimated subset of points as the collider for a differentiated feature. For example, the decimated subset of points may form the exterior surface of a differentiated feature and may have a sufficient density that prevents a user input or another object from passing through the exterior surface. In this example, each point of the decimated subset of points becomes a collider against which collisions with the differentiated feature are detected.

Process 200 includes associating (at 212) each defined (at 210) collider to one or more points from the decimated (at 208) subset of points or differentiated set of points from which that collider was defined (at 210). Associating (at 212) a collider to the one or more points may include anchoring parts of the collider to the one or more points, centering the collider about the one or more points, or otherwise linking the collider to the one or more points. For instance, a collider in the shape of a cylinder may be defined for a first differentiated feature, and the endpoints of the cylinder may be attached or linked to the decimated subset of points at the edges or ends of the cylinder. Associating (at 212) the colliders to the points creates a link between the two such that the colliders move, rotate, scale, and/or transform in unison with the associated set of points.

Process 200 includes adjusting (at 214) collision properties of each defined (at 210) collider based on the attributes of the differentiated set of points associated with that collider. For instance, the points may be defined with non-positional elements that specify a material property, rigidity, elasticity, roughness, softness, or other attribute from which the interactivity of the collider may be configured. The collision properties of a collider may specify an amount of force that is detected by that collider before the associated feature or set of points are displaced, deformed, or otherwise changed. The collision properties may also specify different types of feedback that may be returned in response to detecting a collision with a particular collider. For instance, haptic feedback may simulate different temperatures (e.g., hot or cold), textures (e.g., rough, smooth, rigid, squishy, etc.), and/or other sensations.

Figure 3:
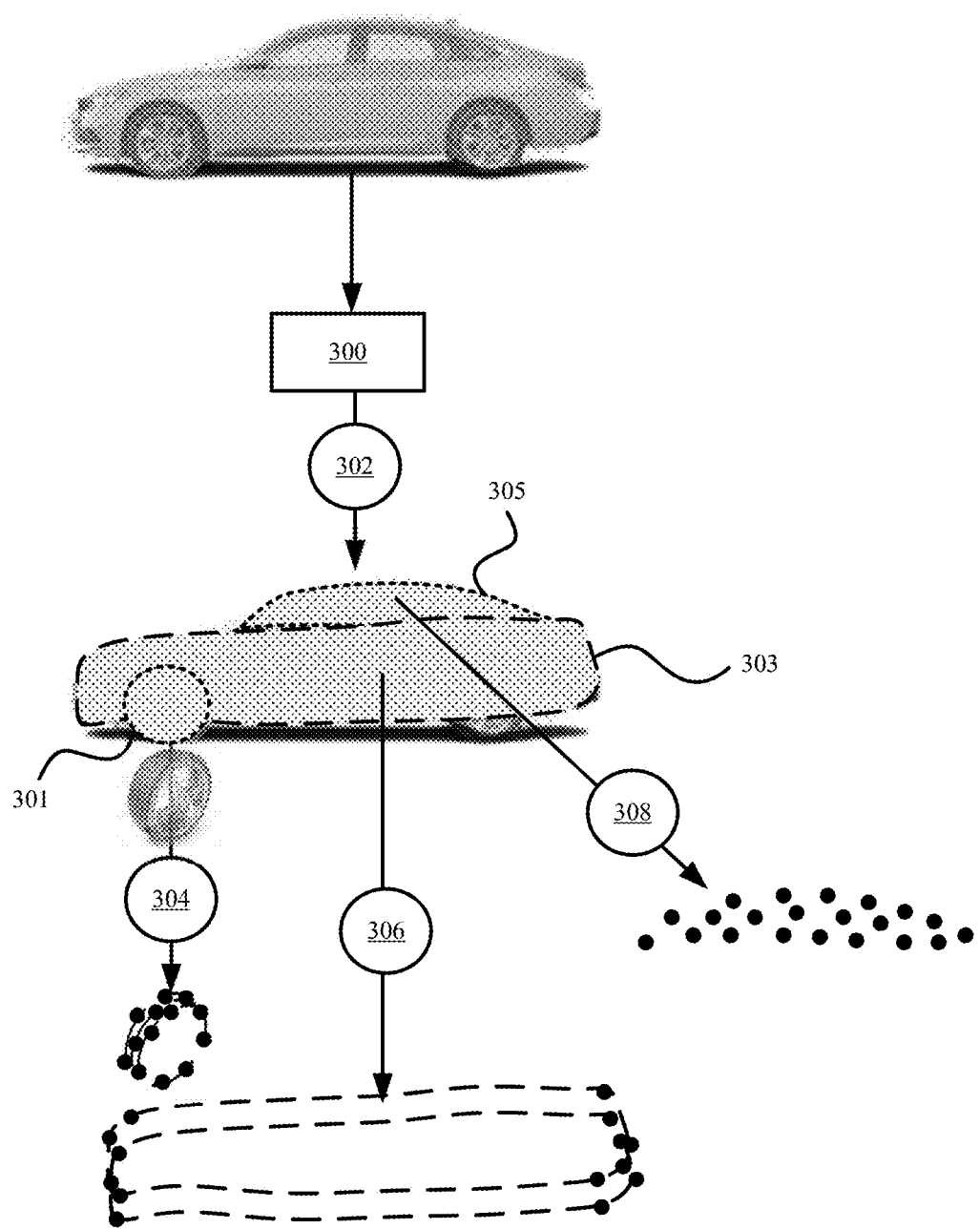
FIG. 3 illustrates an example of different decimations performed for collision generation in accordance with some embodiments presented herein.

FIG. 3 illustrates an example of different decimations performed for collision generation in accordance with some embodiments presented herein. 3D interactivity system 300 selects (at 302) different sets of points that form different features in a point cloud. For instance, 3D interactivity system 300 selects (at 302) first set of points 301 representing a vehicle wheel, second set of points 303 representing the vehicle body, and third set of points 305 representing the vehicle roof. The selection (at 302) may be made based on positional and/or non-positional commonality amongst the points in each set of points.

First set of points 301 form a spherical feature or have a shape that is mostly spherical. 3D interactivity system 300 decimates (at 304) first set of points 301 by retaining a first subset of points that form some of the exterior or outer surfaces of the spherical feature. The points within the interior of the spherical feature are discarded and not used for the collider definition. The retained subset of points preserve the radius, curvature, and/or general shape of the spherical feature with some acceptable amount of deviation. In some embodiments, 3D interactivity system 300 analyzes the positioning and/or surface normals of first set of points 301 to determine the represented spherical shape, and determines to retain the exterior or outer surface points based on the shape analysis.

Second set of points 303 form a cuboid-shaped feature or have a shape that is best represented with a cuboid. 3D interactivity system 300 decimates (at 306) second set of points 303 by retaining a second subset of points at the corners or edges of the cuboid-shaped feature and by discarding other points from second set of points 303. In this case, 3D interactivity system 300 analyzes the positioning and/or surface normals of second set of points 303 to determine that the corner or edge points are sufficient to recreate the shape of the cuboid-shaped feature with the acceptable amount of deviation.

Third set of points 305 form a curved feature. 3D interactivity system 300 decimates (at 308) third set of points 305 by sampling a third subset of points from third set of points 305 that preserve the curvature of the curved feature with significantly fewer points than third set of points 305 representing the curved feature in the point cloud.

Figure 4:
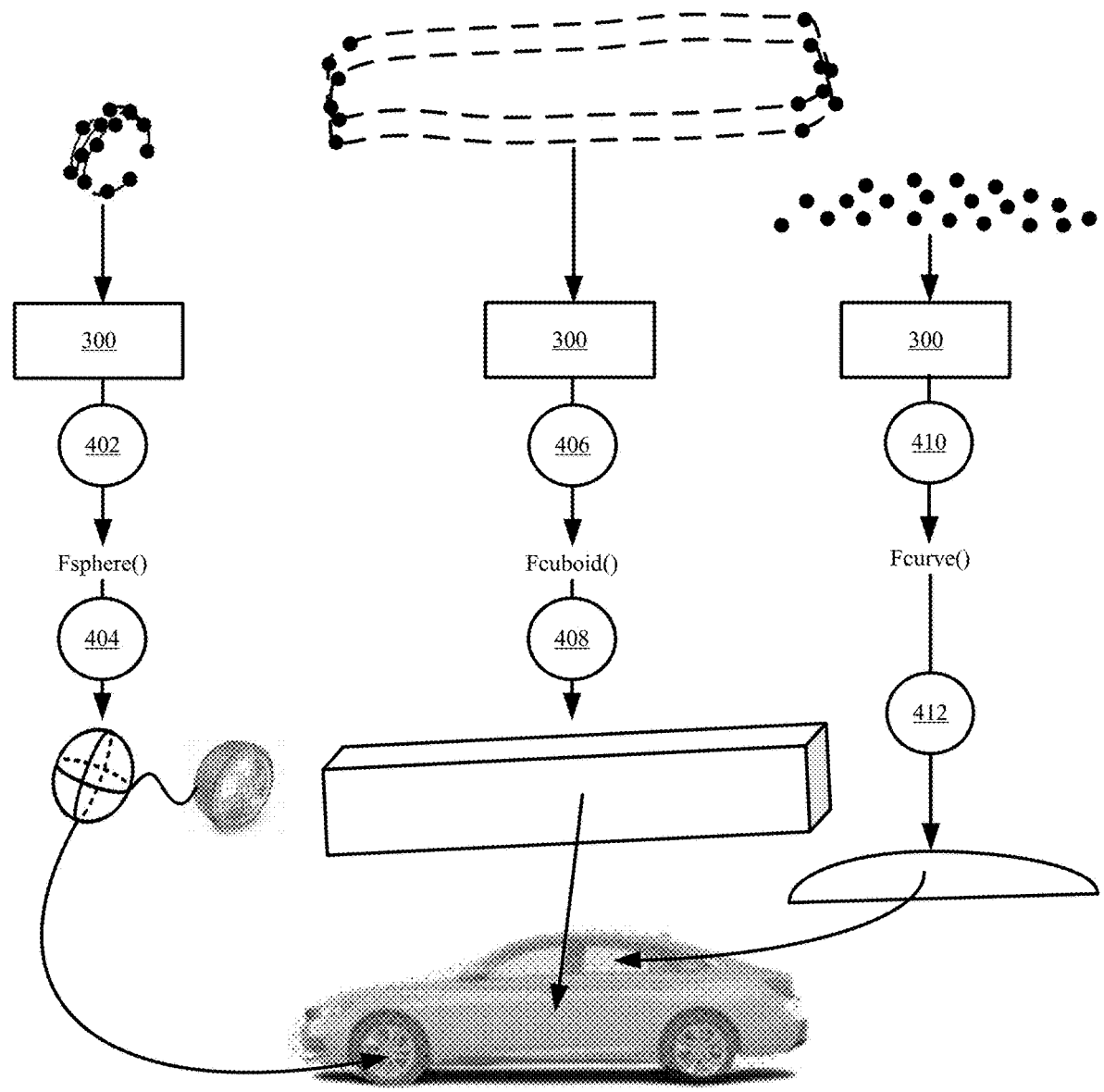
FIG. 4 illustrates an example of dynamically generating colliders based on decimated subset of points for differentiated features of a three-dimensional (3D) object in accordance with some embodiments presented herein.

FIG. 4 illustrates an example of dynamically generating colliders based on decimated subset of points for differentiated features of a 3D object in accordance with some embodiments presented herein. 3D interactivity system 300 dynamically generates the colliders based on the positioning of the decimated subset of points for each differentiated feature.

For the first subset of points retained for the first spherical feature, 3D interactivity system 300 defines (at 402) a first function that generates (at 404) a sphere with a size and shape that is most closely aligned with the positions of the first subset of points at the exterior or outer surface of the first spherical feature. Defining (at 402) the first function may include configuring parameters of the first function to set the size and shape of the generated sphere to match the size and shape of the first subset of points, centering the sphere generated by the first function on a point from the first set of points that is located at the center of the spherical feature, and storing the first function, the configured parameters, and the center point in the point cloud or in a collider file that is associated with the point. For instance, the equation $(x-a)^2+(y-b)^2+(z-c)^2=r^2$ may be used to create the sphere wherein (a, b, c) represents the center point for the sphere and r represents the radius of the sphere.

In some other embodiments, 3D interactivity system 300 generates (at 404) the sphere based on the defined (at 402) first function, and associates the sphere to the point at the center of the spherical feature. At runtime, 3D interactivity system 300 or another system may check for collisions directly against the generated sphere rather than generate the sphere from the first function and perform the collision detection once the sphere has been generated.

For the second subset of points retained for the second cuboid-shaped feature, 3D interactivity system 300 defines (at 406) a second function that generates (at 408) a cuboid with a size and shape that is most closely aligned with the positions of the second subset of points at the edges or corners of the cuboid-shaped feature. Defining (at 406) the second function may include configuring parameters of the second function to set the size and shape of the generated cuboid to match or approximate, with the acceptable amount of deviation, the size and shape of the second subset of points, associating at least one edge or corner of the generated cuboid to the point from the second subset of points that represents that same edge or corner, and storing the configured second function or the generated cube with the point association in the point cloud or in the collider file that is associated with the point cloud.

For the third subset of points retained for the third curved feature, 3D interactivity system 300 defines (at 410) a third function that generates (at 412) a curved surface with a size, shape, and curvature that aligns or conforms with the positions of the third subset of points retained over the surface of the third curved feature. For instance, the third subset of points may deviate from a smooth curve. However, 3D interactivity system 300 may adjust parameters of the third function until arriving at a curve that deviates from the positioning of the third subset of points by less than an acceptable amount. In some embodiments, the generated curved surface may have a 3D form or may include two planar curved surfaces that are connected to one another with the area or space in between being part of the defined collider. The generated curved surface may be attached at one or more ends, corners, or edges to one or more points of the third subset of points that represent those same ends, corners, or edges of the generated curved surface.

The amount of decimation or the number of points retained for each differentiated feature may affect the collider generation. Specifically, the amount of decimation may change the level-of-specificity or shape-conformance of the collider that is generated for a differentiated feature. For instance, the spherical feature may not be a perfect sphere and may contain various grooves, channels, indentation, protrusion, and/or other deviations from the spherical shape. More decimation will result in more of the deviations in the spherical feature being lost in the decimated subset of points. Consequently, the collider that is defined from the decimated subset of points becomes less conforming or less accurate in detecting collisions with those deviations. Less decimation will result in more of the deviations in the spherical feature being retained in the decimated subset of points which will further result in the collider being defined from the decimated subset of points being more conforming and more accurate in detecting collisions with those deviations rather than with the gross shape or overall shape of the spherical feature.

In some embodiments, the amount of decimation is determined based on the level of exactness or accuracy that is desired for the collision detection. For instance, a fighting game involving 3D characters dealing damage to different character features or a shooting game involving fired projectiles causing damage to different features of another 3D object may require a high level of exactness or accuracy, whereas a metaverse environment in which 3D character or 3D object interactions occur with large or low-detailed features may require a low level of exactness or accuracy.

Figure 5:
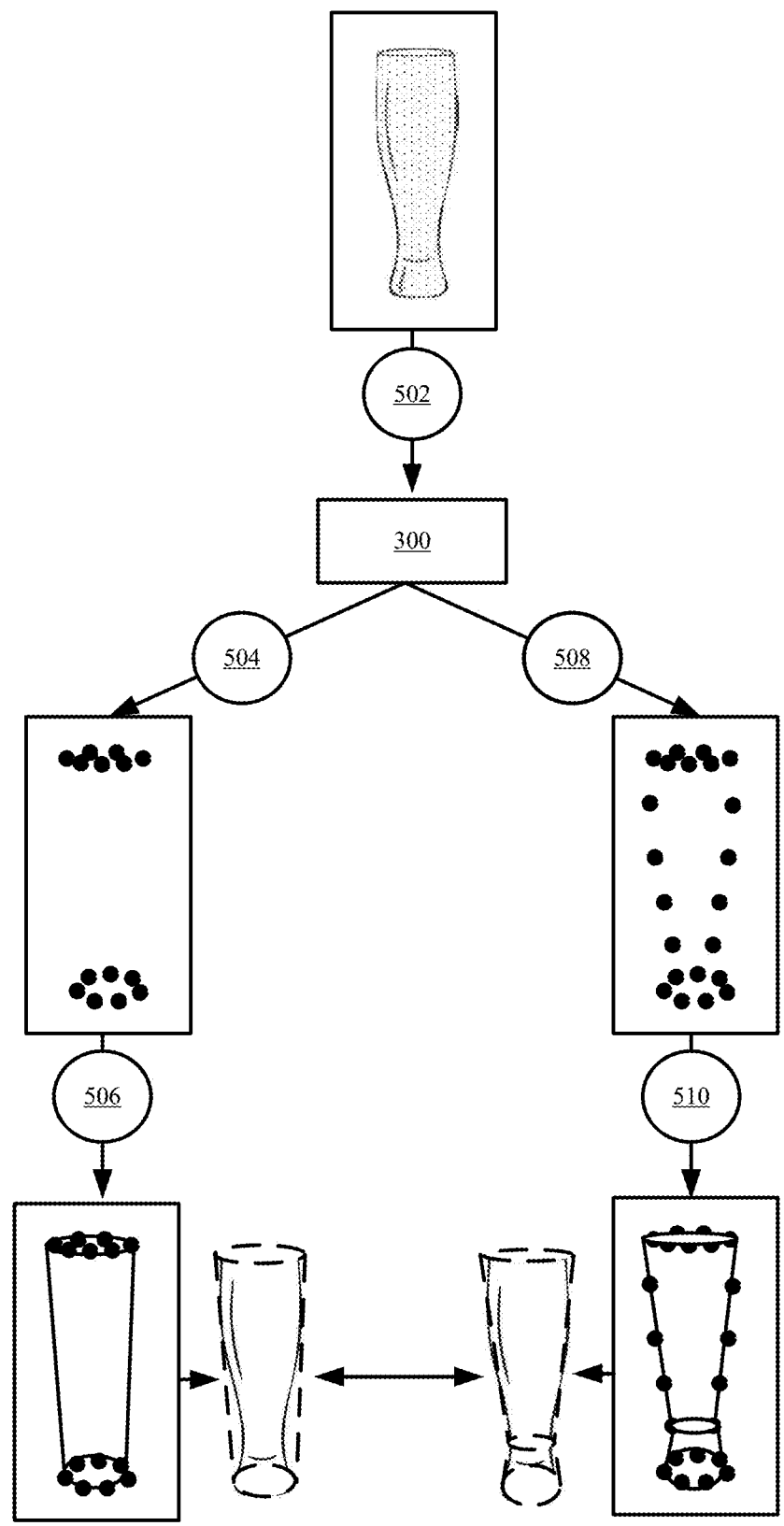
FIG. 5 illustrates an example of changing the collision detection accuracy based on colliders that are defined from different decimated subset of points in accordance with some embodiments presented herein.

FIG. 5 illustrates an example of changing the collision detection accuracy based on colliders that are defined from different decimated subset of points in accordance with some embodiments presented herein. 3D interactivity system 300 receives (at 502) a point cloud and differentiates a feature corresponding to a cup with a concave curvature from the point cloud.

3D interactivity system 300 performs (at 504) a first decimation of the set of points that represent the cup. The first decimation retains a first subset of points that are positioned at the top and bottom rims or edges of the cup.

3D interactivity system 300 generates (at 506) a first collider based on the decimated first subset of points. 3D interactivity system 300 determines that a single truncated cylinder conforms to the shape preserved by the decimated first subset of points, and generates (at 506) the first collider with the truncated cylindrical shape. Specifically, 3D interactivity system 300 determines that the single truncated cylinder may be generated with a shape that has an acceptable amount of deviation from the positions of the decimated first subset of points. In other words, when the single truncated cylinder is attached or linked to the decimated first subset of points, the positions of the single truncated cylinder deviate by less than a threshold amount from the positions of the decimated first subset of points. Although the first collider accurately conforms to the shape of the cup at the top and bottom rims, the first collider loses accuracy with respect to detecting collisions about the concave center of the cup.

To improve the collision detection accuracy, 3D interactivity system 300 performs (at 508) a second decimation of the set of points that represent the cup. The second decimation retains the first subset of points that form the top and bottom rims or edges of the cup and also other points towards the concave center of the cup.

3D interactivity system 300 generates (at 510) a second collider that better conforms to the shape of the cup than the first collider based on the decimated second subset of points. The second subset of points provide additional reference points from which 3D interactivity system 300 generates the shape-conforming second collider. Specifically, 3D interactivity system 300 determines that the shape of a single truncated cylinder deviates by more than a threshold amount from the positioning of the decimated second subset of points. Accordingly, 3D interactivity system 300 generates (at 510) the second collider using two truncated cylinders for the top and bottom portions of the cup, attaches the first inverted truncated cylinder to one or more points representing the top rim of the cup, and attaches the second truncated cylinder to one or more points representing the bottom rim of the cup. The first inverted truncated cylinder is used to detect collisions with the upper portion of the cup and the second truncated cylinder is used to detect collisions with the lower portion of the cup. As a result, the second collider defined from the additional reference points improves the collision detection accuracy relative to the first collider because the second collider better conforms to the shape of the 3D object (e.g., cup) than the first collider.

3D interactivity system 300 may automatically scale, rotate, transform, and/or otherwise adapt the generated colliders to a changing shape of an associated feature or in response to the set of points representing the associated feature being scaled, rotated, transformed, or otherwise adjusted. For a set of points that are animated about a joint, pivot point, or other animation element, 3D interactivity system 300 may associate the dynamically generated collider to that joint, pivot point, or other animation element so that the collider moves in conjunction with the set of points. For a set of points that change positions or shape in response to a detected collision, 3D interactivity system 300 may redefine the collider for the set of points after their positioning is adjusted or may deform or adjust the shape of the existing collider in the same manner as the set of points.

Figure 6:
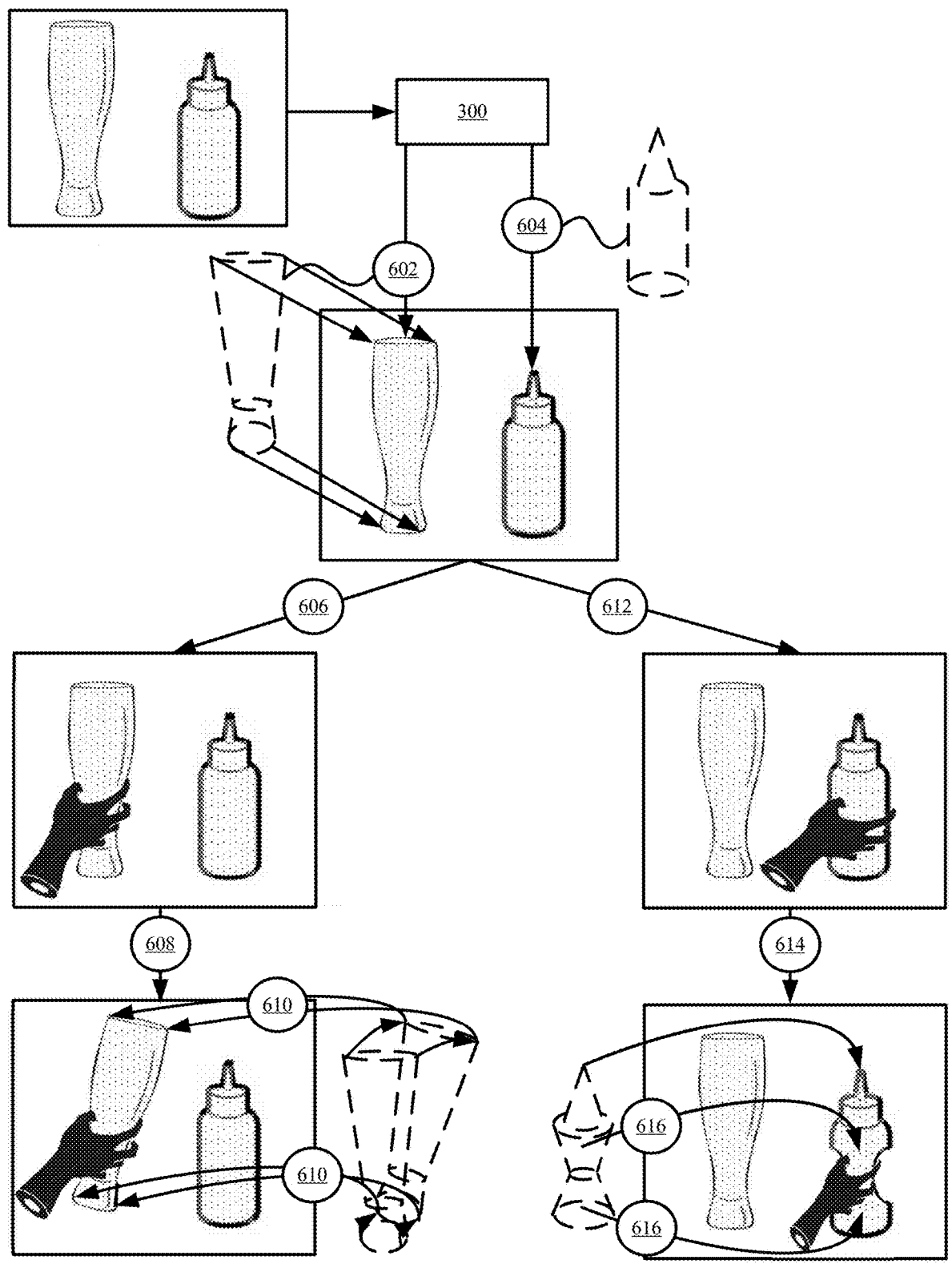
FIG. 6 illustrates examples of dynamically adjusting a collider in response to detecting a collision with that collider in accordance with some embodiments presented herein.

FIG. 6 illustrates examples of dynamically adjusting a collider in response to detecting a collision with that collider in accordance with some embodiments presented herein. 3D interactivity system 300 defines (at 602) and associates a first collider with a first set of points that represent a first interactive feature, and defines (at 604) and associates a second collider with a second set of points that represent a second interactive feature. 3D interactivity system 300 defines (at 602) the first collider using two truncated cylinders that conform to the shape of a decimated subset of points from the first set of points with desired specificity or accuracy (e.g., a threshold amount of deviation from the shape of the first interactive feature), and defines (at 604) the second collider using a cylinder and a cone that conform to the shape of a decimated subset of points from the second set of points with the desired specificity or accuracy.

3D interactivity system 300 detects (at 606) a collision with the first collider. For instance, 3D interactivity system 300 detects (at 606) a user input that is issued at one or more positions that contact one or more positions of the first collider or points of another moving object that contact positions of the first collider.

3D interactivity system 300 performs (at 608) a first action that is defined for a detected collision with the first collider, the first interactive feature, and/or the first set of points. The first action involves moving the first set of points collectively without changing the positional offsets between the first set of points. 3D interactivity system 300 adjusts (at 610) the position of the first collider to follow the changing position of the first set of points. Since the first collider is anchored, attached, or otherwise linked to one or more points of the first set of points, adjusting (at 610) the position of the first collider involves moving the first collider in association with the one or more points to which the first collider is anchored, attached, or otherwise linked. The shape or definition of the first collider remains unchanged.

3D interactivity system 300 detects (at 612) a collision with the second collider. 3D interactivity system 300 performs (at 614) a second action that is defined for a detected collision with the second collider, the second interactive feature, and/or the second set of points. The second action causes the second set of points to be deformed or moved in a manner that changes the relative positional offsets between two or more points in the second set of points.

3D interactivity system 300 redefines (at 616) the second collider in response to the change in the relative positioning of the second set of points. In some embodiments, redefining (at 616) the second collider includes applying the same transformation, deformation, or adjustment to the shape of the second collider as to the second set of points. For instance, if one of the points that the second collider is anchored or attached to changes position, 3D interactivity system 300 may change the position of the edge, corner, or other part of the second collider that is anchored or attached to that point in the same direction and by the same amount as the adjusted point. In some embodiments, redefining (at 616) the second collider includes decimating the second set of points after their positions have been adjusted in a manner that preserves the updated shape of the second interactive feature represented by the repositioned second set of points. 3D interactivity system 300 generates a third collider to replace the second collider based on the new decimated subset of points. For instance, 3D interactivity system 300 determines that the cylinder no longer represents the updated shape of the second interactive feature, and defines the third collider with two truncated cylinders. 3D interactivity system 300 associates the third collider as the new collider for detecting collisions with the repositioned second set of points. Associating the third collider may include selecting different points from the repositioned second set of points to serve as anchor points for the third collider.

In some embodiments, the action that 3D interactivity system 300 performs in response to a collision with a generated collider is determined based on collision properties of the collider. The collision properties may be defined based on material properties of the set of points that the collider is associated with and provides collision detection for. For instance, if the associated set of points are defined with the material property of "metal", 3D interactivity system 300 may define the collision property of the associated collider such that a collision with that collider does not displace or otherwise change the point positions. However, if the associated set of points are defined with the material property of "rubber", 3D interactivity system 300 may define the collision property of the associated collider such that a collision with that collider creates a displacement of the set of points (e.g., an elastic displacement in which the points at the point of contact move inwards and then return to their original positions). Accordingly, the collision properties of the collider may determine a displacement, if any, of the associated set of points in response to a detected collision and/or other parameters associated with that collision including a force, strength, duration, velocity, and/or direction of the detected collision.

To improve computational efficiency associated with detecting collisions with points of a point cloud, 3D interactivity system 300 may restrict the collision detection to the colliders that are generated for the interactive features in a current field-of-view and/or that are a specified distance from a user input or a moving object within the field-of-view.

Figure 7:
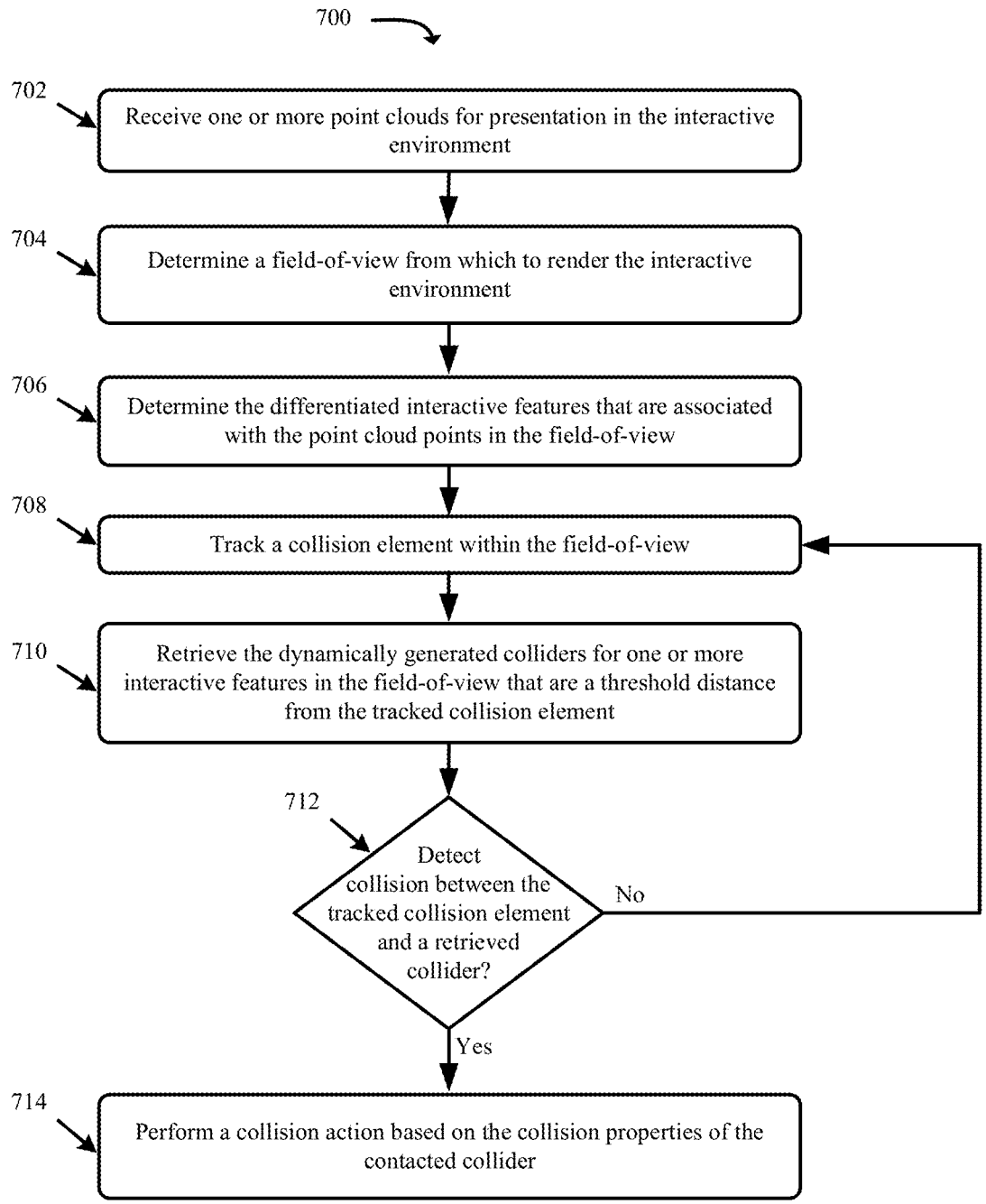
FIG. 7 presents a process for detecting collisions with points of a point cloud in accordance with some embodiments presented herein.

FIG. 7 presents a process 700 for detecting collisions with points of a point cloud in accordance with some embodiments presented herein. Process 700 is implemented by 3D interactivity system 300 or another device or system that renders and/or presents one or more point clouds in an interactive environment once 3D interactivity system 300 has generated the colliders for the interactive features of the one or more point clouds. The interactive environment may incorporate the one or more point clouds as game elements or interactive elements in a 3D space. Accordingly, the interactive environment may include a video game, animation, virtual reality, mixed reality, augmented reality, spatial computing, or other 3D space in which the objects or interactive features defined in the one or more point clouds interact with one another, with real-world elements, and/or user input.

Process 700 includes receiving (at 702) one or more point clouds for presentation in the interactive environment. The one or more point clouds include the digital assets (e.g., 3D characters, objects, etc.) of the interactive environment. The point clouds or the 3D objects defined within the point clouds may be positioned in the interactive environment based on predefined positions or programmatic instructions associated with creating the interactive environment. In some embodiments, the 3D space of the one or more point clouds correspond to the interactive environment. In other words, the interactive environment may be defined or contained by the point of a single point cloud or the combination of points from one or more point cloud. The 3D objects formed by the points of the one or more point clouds may be stationary or may be moveable with user inputs, defined animations, programmatic instructions (e.g., non-playable characters), or collisions. The one or more point clouds also include the colliders that have been automatically defined for and associated with the different interactive features of the 3D objects by 3D interactivity system 300. In other words, 3D interactivity system 300 receives the one or more point clouds and generates the colliders prior to the point clouds being presented in the interactive environment.

Process 700 includes determining (at 704) a field-of-view from which to render the interactive environment. The field-of-view is determined (at 704) based on the positioning and/or orientation of a virtual camera placed within the interactive environment. The field-of-view may change in response to user inputs or scripted animations. For instance, the field-of-view may change as the user input adjusts a first-person viewpoint or moves a playable character within the interactive environment. In other words, the point clouds in the interactive environment may create an open virtual world for play, exploration, or viewing, and the field-of-view restricts the viewing of the interactive environment to a specific vantage point.

Process 700 includes determining (at 706) the differentiated interactive features that are associated with the point cloud points in the field-of-view. 3D interactivity system 300 identifies the points with positional values that are in range of the positions spanned by the field-of-view, and determines if the identified points are associated with any differentiated features that are also associated with a generated collider. Accordingly, 3D interactivity system 300 may ignore the colliders that are associated with interactive features not in the current field-of-view.

Process 700 includes tracking (at 708) a collision element within the field-of-view. In some embodiments, 3D interactivity system 300 simultaneously tracks multiple collision elements within the field-of-view.

Tracking (at 708) the collision element may include tracking user input that is provided by a controller and/or input device and that may touch, contact, or otherwise interact with the 3D object or interactive features presented in the interactive environment. For instance, the interactive environment may be a virtual reality environment and the user inputs may control virtual hands or fingers for touching or otherwise interacting with objects rendered within the field-of-view. Alternatively, the user input may control a character in the interactive environment that may contact or interact with interactive features in the interactive environment, or may control interactive elements in the interactive environment. For instance, the user input may be used to shoot a projectile or move an interactive element (e.g., a digital sword) that may collide with other interactive features in the interactive environment.

Tracking (at 708) the collision element may also include tracking moving objects in the interactive environment that are not controlled by user input. The objects may include non-playable characters or objects (e.g., vehicles moving in a virtual world) that may collide with other objects or interactive features as a result of the movement.

Process 700 includes retrieving (at 710) the dynamically generated colliders for one or more interactive features in the field-of-view that are a threshold distance from the tracked (at 708) collision element. In some embodiments, 3D interactivity system 300 generates the colliders (e.g., their shapes, volumes, areas, planes, etc.) at runtime based on the functions that are associated with the one or more interactive features. In some other embodiments, the colliders are pregenerated and stored as part of or in association with the point cloud points so that the retrieval (at 710) involves loading the colliders for the one or more interactive features into memory when they are needed for collision detection. The distance determination improves collision detection efficiency by restricting the collision detection to the colliders of the interactive features that are within the threshold distance of the collision element, and by avoiding collision detection calculations against colliders that are not in range of the collision element.

Process 700 includes determining (at 712) if the collision element collides with the retrieved (at 710) colliders for the one or more interactive features that are the threshold distance from the collision element. The collision determination (at 712) involves comparing the positions of the collision element with positions of the retrieved (at 710) colliders. Specifically, 3D interactivity system 300 determines if the collision element contacts, intersects, or otherwise collides with any surface, face, plane, edge, or part of a retrieved (at 710) collider as a result of having a position that matches a position at any part of a collider.

In response to determining (at 712—No) that the collision element does not collide with any of the retrieved (at 710) colliders, process 700 continues tracking (at 708) the collision element for the current field-of-view. If the field-of-view changes, process 700 includes determining (at 706) the differentiated interactive features in the updated field-of-view in addition to tracking (at 708) the collision element to determine (at 712) if the collision element collides with colliders of any interactive feature in the updated field-of-view.

In response to determining (at 712—Yes) that the collision element collides with a collider of a particular interactive feature, process 700 includes performing (at 714) a collision action based on the collision properties of that collider. Performing (at 714) the collision action may include providing haptic feedback or other feedback that notifies the user of the collision. Performing (at 714) the collision action may include adjusting the collision element or the points of the particular interactive feature based on the detected collision. For instance, the collision element may bounce off, explode, ricochet, or disappear upon colliding with the particular interactive feature. Similarly, the points of the particular interactive feature may dynamically move, deform, or otherwise transform based on the direction, strength, duration, size, and/or other properties detected for the collision or the collision element. Performing (at 714) the collision action may further include executing different code, functions, effects, and/or instructions that are defined for the collision between the collision element and the particular interactive feature. For instance, the collision action may lower the health of a character associated with the particular interactive feature, add to the user's point total, and/or change actions of non-playable characters.

By limiting the collision detection to a subset of colliders for interactive features that are in the field-of-view and in proximity to the tracked collision element, 3D interactivity system 300 reduces the number of colliders that are loaded into memory at any given time while also reducing the number of computations that are performed to detect a collision occurring in the field-of-view. This then allows 3D interactivity system 300 to generate shape-conforming colliders that follow the contours and varying shapes of the interactive features more closely which, in turn, allows 3D interactivity system 300 to perform more accurate collision detection without human involvement in the creation of the colliders or collision detection steps.

3D interactivity system 300 is able to further improve collision detection efficiency and accuracy as a result of dynamically generating the colliders based on different decimations of the points representing the interactive features. For instance, prior art collision detection systems rely on predefined static colliders. Accordingly, the same computational effort is required in the prior art collision detection systems to detect a collision with an interactive feature associated with a predefined static collider whether that interactive feature is in the background and rendered at a small size or is in the foreground and rendered at a large size. However, 3D interactivity system 300 may dynamically adjust the computational effort by increasing or decreasing the amount of decimation when the interactive feature is in the foreground or the background, and by changing the resolution or complexity of the shape for the dynamically generated collider based on the different decimation of points produced in response to the different positioning or size of the interactive feature.

Figure 8:
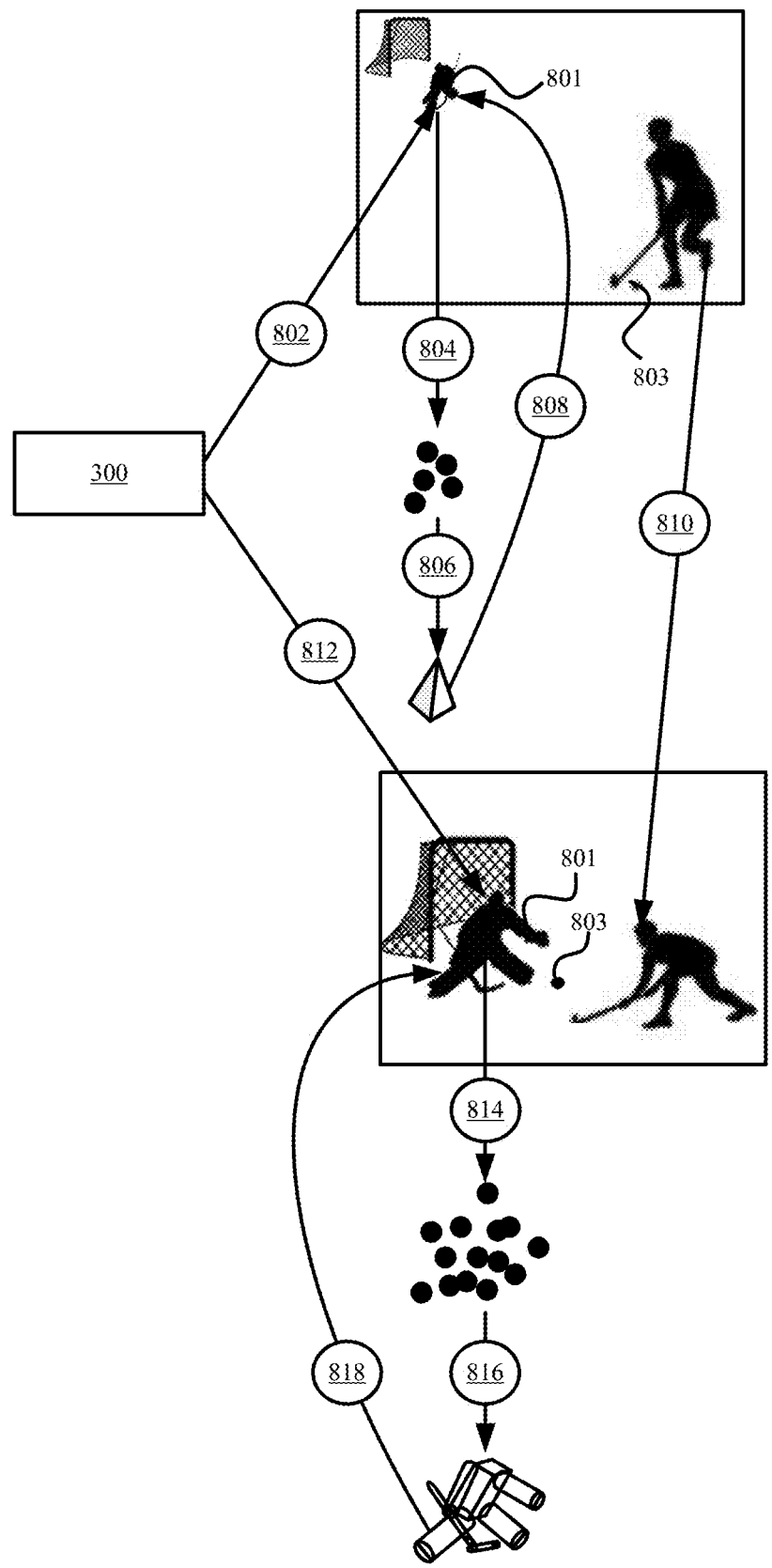
FIG. 8 illustrates an example of dynamically adjusting the colliders for interactive features of a point cloud in accordance with some embodiments presented herein.

FIG. 8 illustrates an example of dynamically adjusting the colliders for interactive features of a point cloud in accordance with some embodiments presented herein. As shown in FIG. 8, one or more interactive features 801 correspond to different parts of a hockey goalie 3D character and first appear in the background at a first small size. High collision detection precision or accuracy is not required when interactive feature 801 is so distant in the field-of-view and rendered at such a small size. Specifically, the detailed contours of interactive features 801 are not visible such that there is no need to define a collider that capture the exact shape of interactive features 801.

3D interactivity system 300 detects (at 802) the positioning of interactive features 801, and determines that a low level of precision is sufficient for collision detection of interactive features 801 when positioned in the background and/or rendered at the first small size. Accordingly, 3D interactivity system 300 decimates (at 804) the set of points representing interactive features 801 by a first amount, generates (at 806) a first collider that grossly approximates the shape of interactive features 801 (when positioned in the background at the first small size), and associates (at 808) or uses the first collider to detect collisions with interactive features 801 at the distant position in the field-of-view. The first collider may include a simple pyramid.

Consistent with the disclosure of FIG. 7, 3D interactivity system 300 may generate (at 806) and/or use the first collider in response to interactive features 801 being in the field-of-view (in the background at the first small size) and tracking collision element 803 that is in proximity of interactive features 801. As shown in FIG. 8, the interactive environment may be a 3D hockey video game, interactive features 801 correspond to different parts of a non-playable goalie against which a collision may be detected, and tracked collision element 803 may include the puck. In this case, detecting a collision between the puck and the gross approximation of the overall goalie shape is sufficient for shots issued at a large distance from interactive features 801. As a different example, the interactive environment may be a first-person shooting game, the tracked collision element may include a virtual bullet fired from a virtual weapon, and the virtual bullet may be directed to the interactive feature in the background. In this example, detecting a collision between the virtual bullet and the gross approximation of the interactive feature shape is sufficient for shots fired from a long distance.

User input, programmatic instructions, or a changing field-of-view may change (at 810) the position or arrangement of interactive features 801 in the interactive environment. For instance, the user may move their virtual character closer to interactive features 801 such that interactive features 801 are now in the foreground and/or appear at a second size that is larger than the first size at which interactive features 801 were rendered in the background. Accordingly, more of the detail and shape of interactive features 801 are now visible.

3D interactivity system 300 detects (at 812) the updated positioning of interactive features 801. 3D interactivity system 300 determines that a high level of precision is needed for collision detection of interactive features 801 when positioned in the foreground and/or rendered at the larger second size.

Accordingly, 3D interactivity system 300 decimates (at 814) the set of points representing interactive features 801 by a second amount that is less than the first amount and that retains more of the points than the decimation by the first amount. For instance, the second decimation preserves points-of-reference for the each of the goalie limbs, head, and stick, whereas the first decimation preserved points-of-reference for the goalie upper and lower body.

3D interactivity system 300 generates (at 816) a second collider that conforms with the additional details, contours, and/or shapes of interactive features 801 that become visible when interactive features 801 are rendered in the foreground at the larger second size and that are captured by the newly decimated subset of points (e.g., the subset of points retained from decimating the set of points by the second amount). The second collider may be formed by multiple shapes or a shape with various contours that follow the detailed shapes of interactive features 801 and/or that are within an acceptable distance or threshold distance from the positions of the newly decimated subset of points. For instance, the second collider may be defined using different cylinders for each of the goalie limbs, a cuboid for the goalie torso, and a cylinder for the goalie stick.

3D interactivity system 300 associates (at 818) the second collider to interactive features 801 in the updated field-of-view, and uses the second collider to more accurately detect a collision with collision element 803 in the updated field-of-view. Specifically, by defining the second collider with multiple shapes instead of the single pyramid used for the first collider, 3D interactivity system 300 is able to determine whether collision element 803 passes between the different shapes representing the limbs, stick, and/or other differentiated interactive features 801 which would not be possible when detecting collisions with the single shape defined for the first collider.

Accordingly, 3D interactivity system 300 may dynamically increase the resolution of the colliders or adapt the shape of the colliders based on the size or distance of the associated interactive features in the field-of-view. The changing resolution or shape of the colliders improves computational efficiency and collision detection accuracy dynamically as the interactive features associated with the colliders move within the field-of-view. In some embodiments, 3D interactivity system 300 also accounts for available resources of the device or system rendering the interactive environment when adjusting the specificity or shape of the colliders.

Figure 9:
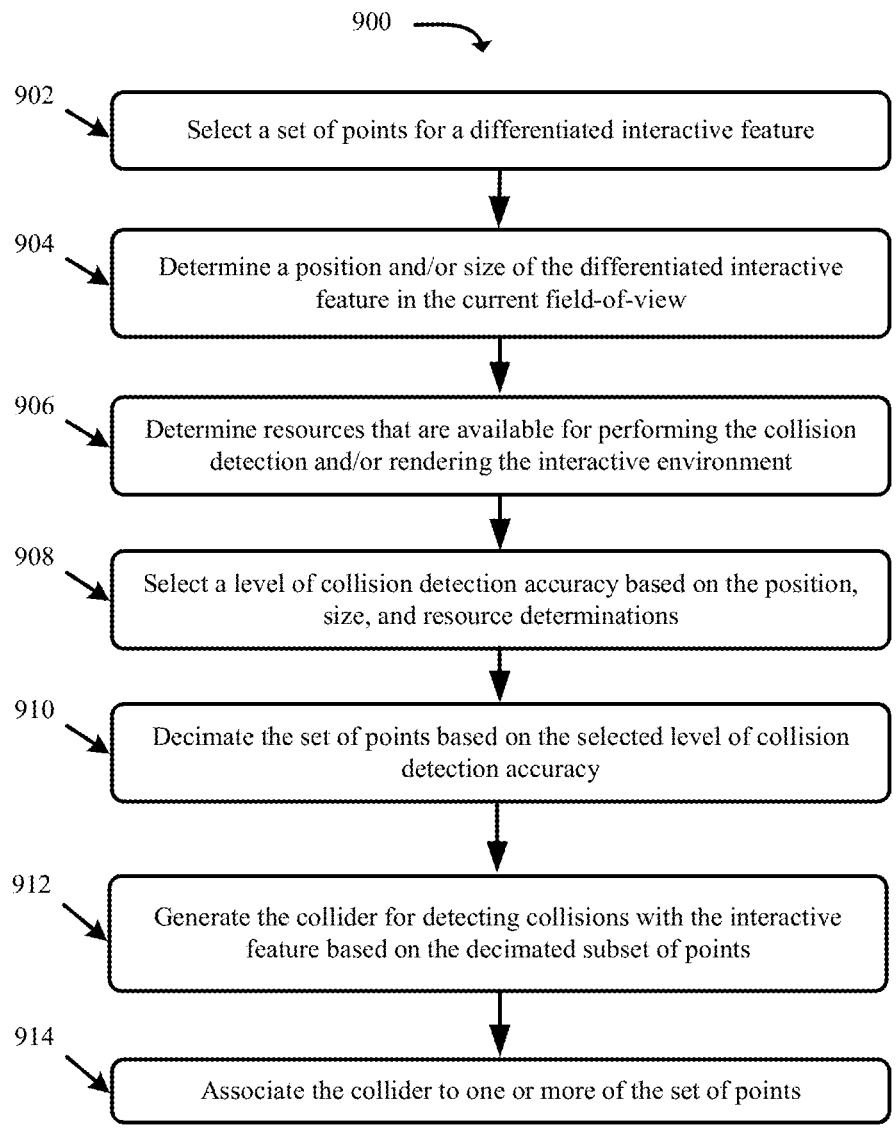
FIG. 9 presents a process for dynamically generating the colliders in accordance with some embodiments presented herein.

FIG. 9 presents a process 900 for dynamically generating the colliders in accordance with some embodiments presented herein. Process 900 is implemented by 3D interactivity system 300.

Process 900 includes selecting (at 902) a set of points for a differentiated interactive feature of a point cloud or for a differentiated interactive feature that is presented in an interactive environment. The differentiated interactive feature may be an entire 3D object or part of a 3D object and the set of points include points from a point cloud that is used to create part or all of the interactive environment.

Process 900 includes determining (at 904) a position and/or size of the differentiated interactive feature in the current field-of-view. For instance, 3D interactivity system 300 may analyze the z-depth of the differentiated interactive feature and/or determine the percentage of the field-of-view that is occupied by the differentiated interactive feature.

Process 900 includes determining (at 906) resources that are available for performing the collision detection and/or rendering the interactive environment. The available resource may decrease in response to the number of tracked collision elements increasing. For instance, if the interactive environment has only a single collision element (e.g., a single moving object that may collide with other objects), then the available resources for collision detection may increase because the collision detection is performed with respect to that single collision element. However, if the interactive environment has multiple collision elements, then the available resources for collision detection may decrease because different simultaneous collision detection calculations are performed for each of the multiple collision elements. The resource determination (at 906) may also be based on the hardware resources and/or compute power of the system or device performing the collision detection and/or rendering the interactive environment. Newer generation processors with higher core counts and operating frequencies as well as special-purposed graphical processing units (GPUs) and/or other processors may be able to perform a greater number of collision calculations than older generation processors or general purpose processors.

Process 900 includes selecting (at 908) a level of collision detection accuracy based on the position, size, and resource determinations (at 904 and 906). The selected level of collision detection accuracy may specify an acceptable amount of deviation between the shape of a generated collider and the actual shape of the interactive feature and/or an amount of decimation that is related to preserving a specific amount of the interactive feature shape.

Process 900 includes decimating (at 910) the set of points based on the selected level of collision detection accuracy. The decimation (at 910) involves retaining certain points from the set of points from which the shape of the interactive feature may be recreated with the acceptable amount of deviation specified in the selected level of collision detection accuracy.

Process 900 includes generating (at 912) the collider for detecting collisions with the interactive feature based on the decimated subset of points. The collider is generated to conform to the interactive feature shape that is preserved by the decimated subset of points. For instance, the collider is generated as one or more shapes that may be represented mathematically, with expressions, with coordinates, or in another condensed format to span or cover the volume, area, plane, or region between the decimated subset of points.

Process 900 include associating (at 914) the collider to one or more of the set of points. Associating (at 914) the collider to the one or more points includes attaching, anchoring, or otherwise linking different corners, edges, or parts of the collider to the one or more points so that the collider moves and/or transforms in conjunction with the set of points. Consequently, the collider may be used to detect collisions with the interactive feature. Specifically, 3D interactivity system 300 detects a collision when a position of another object (e.g., a collision element, user input, etc.) matches any position of the associated (at 914) collider.

Figure 10:
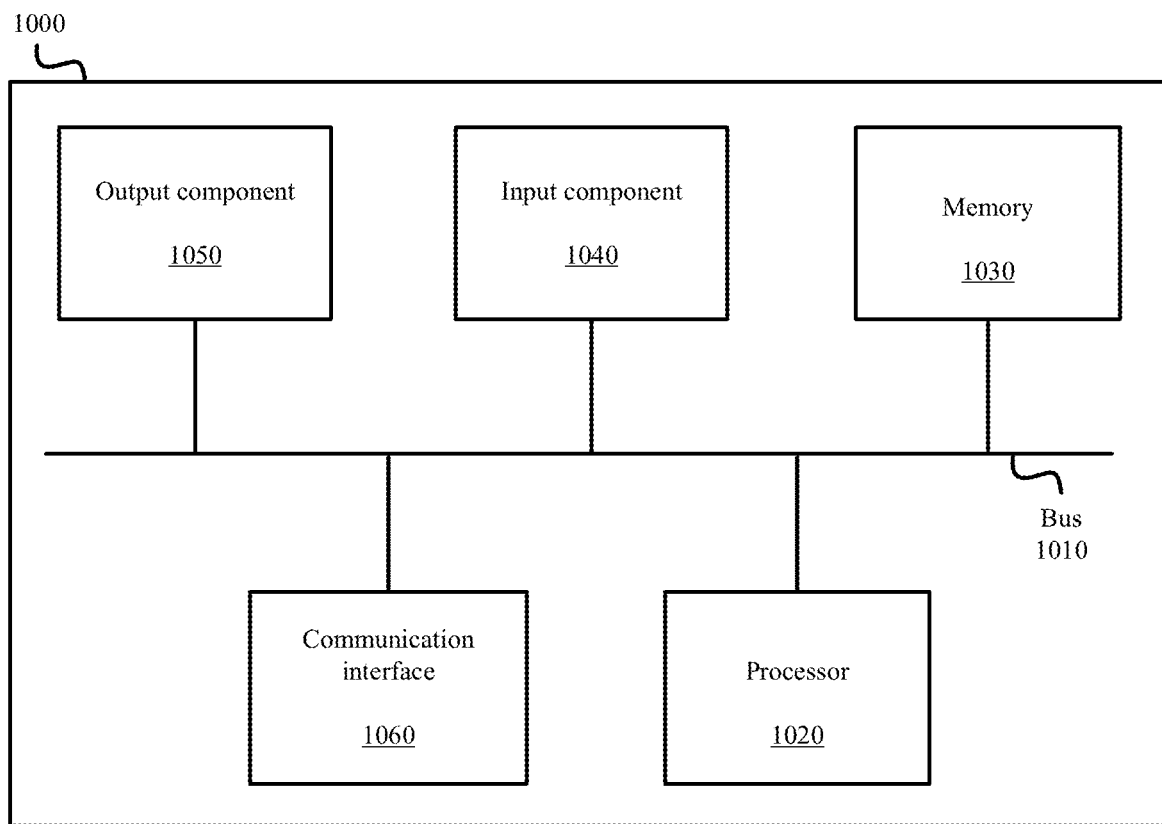
FIG. 10 illustrates example components of one or more devices, according to one or more embodiments described herein.

FIG. 10 is a diagram of example components of device 1000. Device 1000 may be used to implement one or more of the tools, devices, or systems described above (e.g., 3D interactivity system 300 or other systems and devices used to render the interactive environment and/or perform the collision detection with the colliders generated by 3D interactivity system 300). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    selecting a set of points from a plurality of points that are distributed in a three-dimensional (3D) space, wherein the set of points represent a particular feature of a 3D object;
    decimating the set of points to a subset of points that represent an approximate shape of the particular feature with fewer points than the set of points;
    generating a collider with the approximate shape represented by the subset of points; and
    using the collider in determining whether a collision element collides with the particular feature.

2. The method of claim 1 further comprising:
    associating the collider to one or more points of the set of points; and moving the collider in combination with the set of points in response to associating the collider to the one or more points.

3. The method of claim 2, wherein associating the collider to the one or more points comprises:
linking an edge or corner of the collider to a point from the set of points that represents the edge or corner on the particular feature.

4. The method of claim 1 further comprising:
detecting a collision with the particular feature in response to the collision element having a position that contacts a position anywhere along the approximate shape of the collider; and
performing a collision action associated with the collider in response to detecting the collision.

5. The method of claim 1, wherein the plurality of points collectively form the 3D object, and wherein the particular feature is an interactive component of the 3D object.

6. The method of claim 1 further comprising:
differentiating the set of points from the plurality of points based on a detected commonality amongst the set of points that is not present in other points of the plurality of points.

7. The method of claim 1 further comprising:
determining an amount by which the approximate shape of the collider is to match a shape of the particular feature; and
wherein decimating the set of points comprises:
selecting the subset of points to retain from the set of points based on the amount by which the approximate shape of the collider is to match the shape of the particular feature.

8. The method of claim 7, wherein determining the amount comprises:
detecting one or more of a size or a position of the particular feature in a field-of-view;
increasing the amount in response to detecting a first size or a first position of the particular feature; and
decreasing the amount in response to detecting a second size or a second position of the particular feature that is smaller or more distant than the first size or the first position.

9. The method of claim 7, wherein determining the amount comprises:
determining available resources for collision detection or rendering the plurality of points;
increasing the amount in response to the available resources being greater than a threshold; and
decreasing the amount in response to the available resources being less than the threshold.

10. The method of claim 1, wherein generating the collider comprises:
defining one or more functions that generate one or more different shaped volumes that collectively form the approximate shape.

11. The method of claim 1 further comprising:
determining that the approximate shape of the collider deviates from a shape of the particular feature by more than an acceptable amount;
decimating the set of points to a second subset of points that includes more points than the subset of points and that preserves more of the shape of the particular feature than the subset of points; and
replacing the collider with a second collider that is generated based on the second subset of points.

12. The method of claim 1 further comprising:
determining that the particular feature has moved from a first position in a field-of-view to a second position in the field-of-view;
determining a different level of specificity for detecting collisions with the particular feature at the second position than at the first position;
generating a second collider based on a different decimation of the set of points; and
using the second collider to detect collisions with the particular feature at the second position.

13. The method of claim 1, wherein decimating the set of points comprises:
retaining points from the set of points corresponding to corners or edges of the particular feature; and
discarding other points from the set of points forming an interior of the particular feature.

14. The method of claim 1, wherein decimating the set of points comprises:
retaining points from the set of points that form an exterior of the particular feature; and
discarding points from the set of points that form an interior of the particular feature.

15. The method of claim 1, wherein the collision element corresponds to user input that is issued in an interactive environment in which the particular feature is presented or a moving object within the interactive environment.

16. A three-dimensional (3D) interactivity system comprising:
one or more hardware processors configured to:
select a set of points from a plurality of points that are distributed in a three-dimensional (3D) space, wherein the set of points represent a particular feature of a 3D object;
decimate the set of points to a subset of points that represent an approximate shape of the particular feature with fewer points than the set of points;
generate a collider with the approximate shape represented by the subset of points; and
use the collider in determining whether a collision element collides with the particular feature.

17. The 3D interactivity system of claim 16, wherein the one or more hardware processors are further configured to:
associate the collider to one or more points of the set of points; and
move the collider in combination with the set of points in response to associating the collider to the one or more points.

18. The 3D interactivity system of claim 17, wherein associating the collider to the one or more points comprises:
linking an edge or corner of the collider to a point from the set of points that represents the edge or corner on the particular feature.

19. The 3D interactivity system of claim 16, wherein the one or more hardware processors are further configured to:
detect a collision with the particular feature in response to the collision element having a position that contacts a position anywhere along the approximate shape of the collider; and
perform a collision action associated with the collider in response to detecting the collision.

20. A non-transitory computer-readable medium storing instructions that, when executed by one or more processors of a three-dimensional (3D) interactivity system, cause the 3D interactivity system to perform operations comprising:

selecting a set of points from a plurality of points that are distributed in a three-dimensional (3D) space, wherein the set of points represent a particular feature of a 3D object;

decimating the set of points to a subset of points that represent an approximate shape of the particular feature with fewer points than the set of points;

generating a collider with the approximate shape represented by the subset of points; and using the collider in determining whether a collision element collides with the particular feature.

* * * * *